March 23, 1971 — W. C. L. HEMEON — 3,572,128
DUSTFALL SAMPLING APPARATUS
Filed June 13, 1969 — 2 Sheets-Sheet 1

INVENTOR.
WESLEY C. L. HEMEON
BY
Brown, Murray, Flick & Peckham
ATTORNEYS.

March 23, 1971   W. C. L. HEMEON   3,572,128
DUSTFALL SAMPLING APPARATUS
Filed June 13, 1969   2 Sheets-Sheet 2
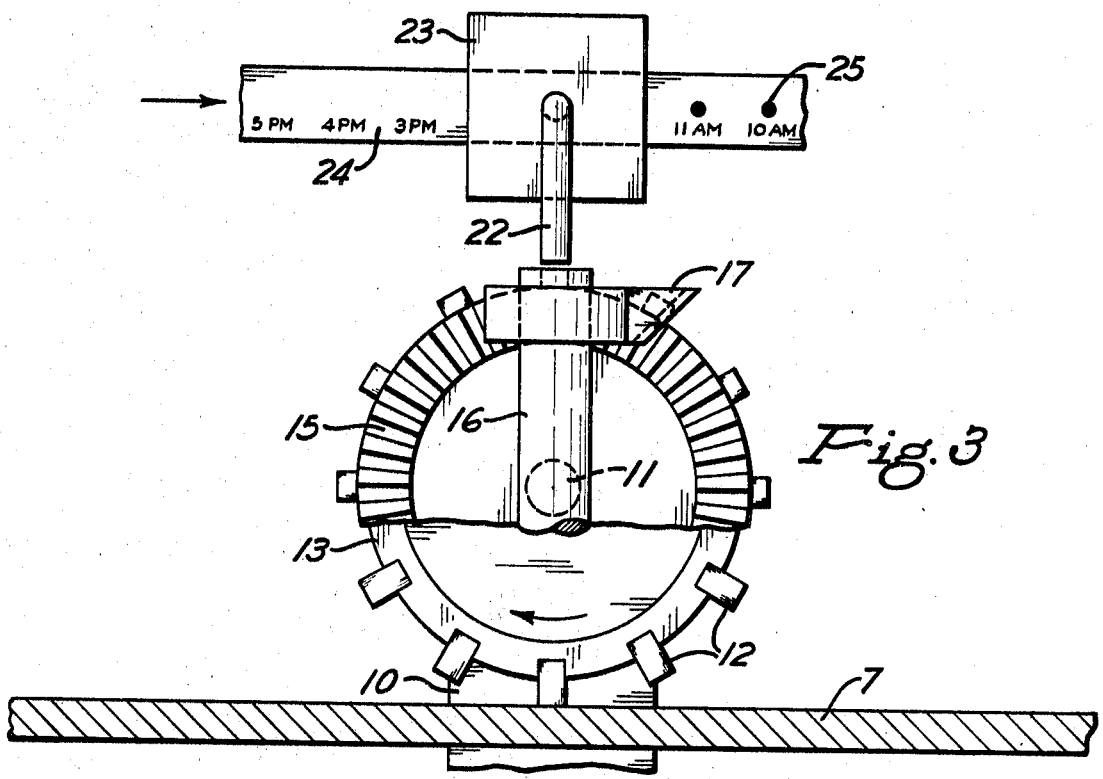
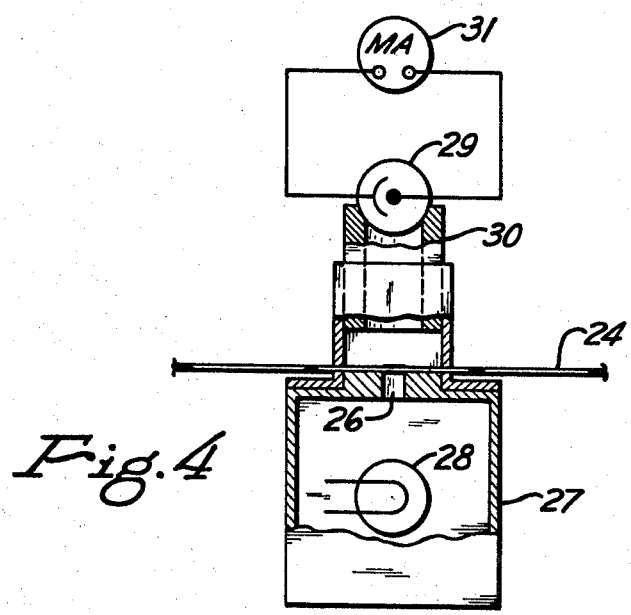
INVENTOR.
WESLEY C. L. HEMEON
BY
Brown, Murray, Flick & Peckham
ATTORNEYS.

United States Patent Office 3,572,128
Patented Mar. 23, 1971

3,572,128
DUSTFALL SAMPLING APPARATUS
Wesley C. L. Hemeon, 5618 Northumberland St.,
Pittsburgh, Pa. 15217
Filed June 13, 1969, Ser. No. 832,941
Int. Cl. G01n 1/00
U.S. Cl. 73—421                              8 Claims

ABSTRACT OF THE DISCLOSURE

A series of wipers are disposed above a smooth horizontal surface that collects falling dust. Periodically, wiping movement is effected between the collecting surface and each wiper in succession so that the dust is removed from that surface and retained on the wiper engaging it. This wiper then is moved to a storage position and the next wiper is moved into contact with the collecting surface. Means are provided for removing the dust from each successive wiper in storage position and for measuring the quantity of dust so removed.

---

It is among the objects of this invention to provide dustfall sampling apparatus which is automatic, which is simple in construction and operation, which enables the rate of dustfall to be measured easily for short sequential time periods, which permits the collection of numerous short-term samples in sequence within a given sampling period and storage of them for subsequent evaluation, and which can be operated by a battery.

The preferred embodiment of the invention is illustrated in the accompanying drawings, in which FIG. 1 is a side view;

FIG. 3 is an enlarged vertical side view taken on the line III—III of FIG. 1; and FIG. 4 is a vertical section through a dust measuring device.

Figure 1:
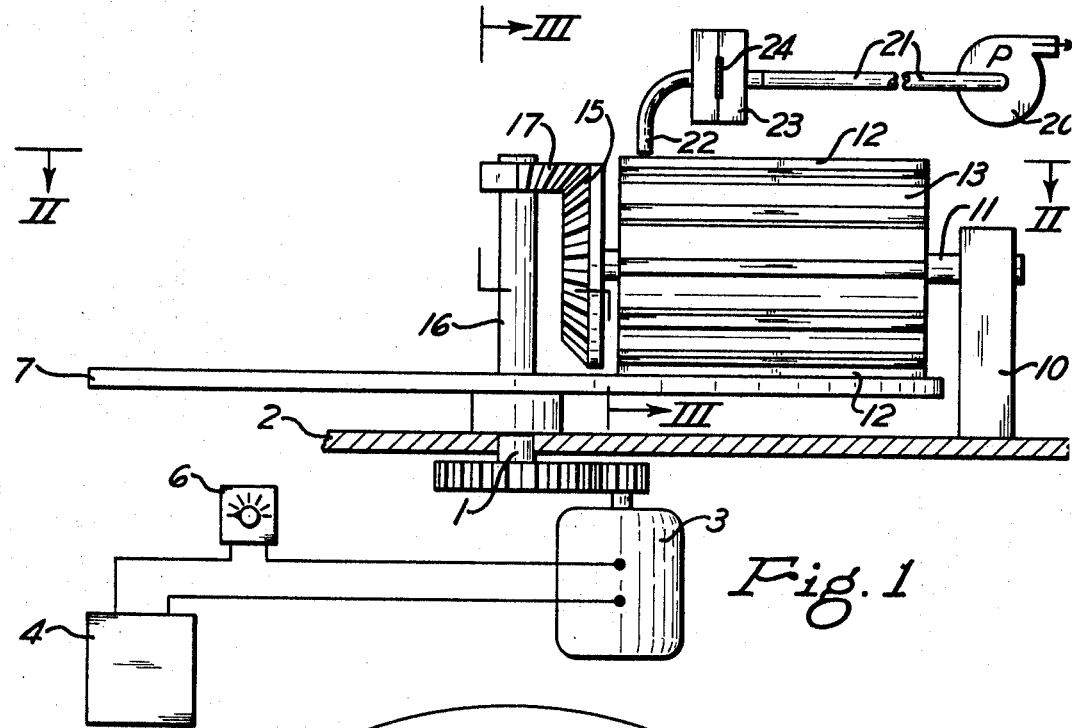
Figure 2:
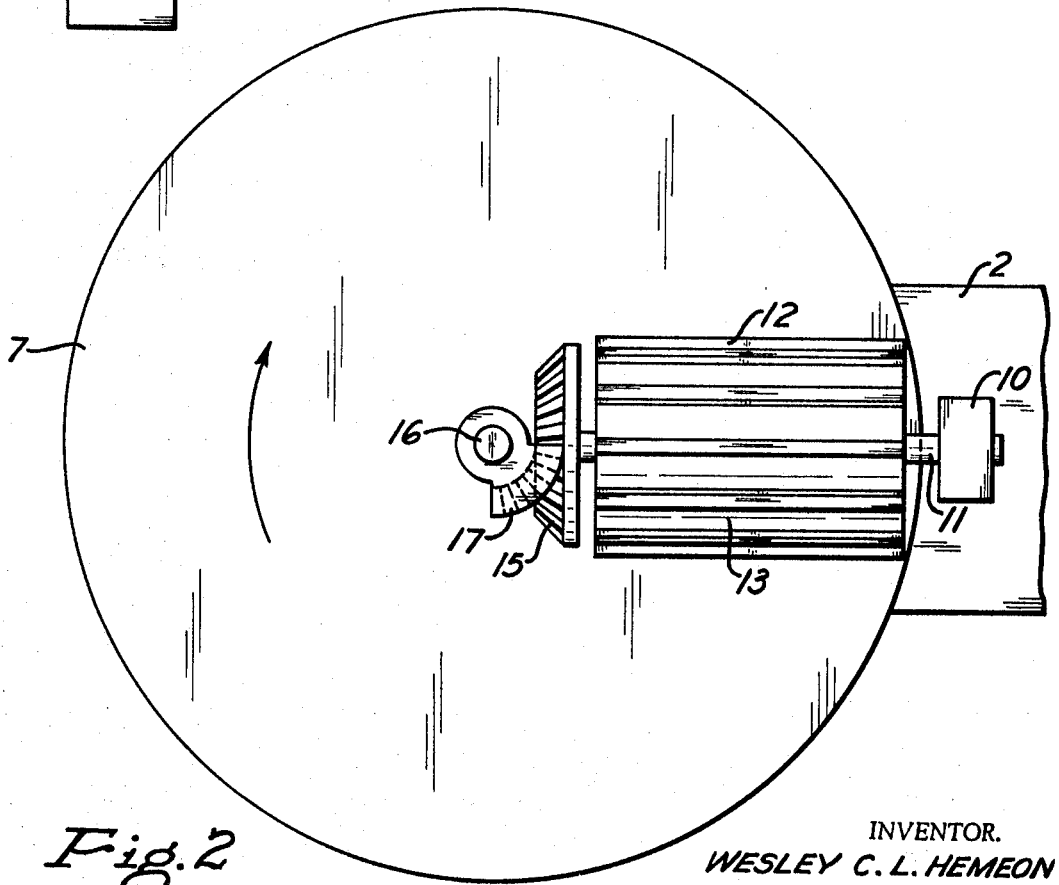
FIG. 2 is a plan view taken on the line II—II of FIG. 1.

Referring to FIGS. 1 to 3 of the drawings, a vertical shaft 1 is rotatably mounted in a suitable support 2 and is driven from its lower end by an electric motor 3 powered by a battery 4. The electric circuit between the battery and the motor contains a normally open switch in a timer 6 that closes the switch at regular intervals. The switch remains closed for one full revolution of the shaft or a multiple thereof. Rigidly mounted on the shaft is a horizontal disc or table 7 having a highly polished upper surface. The table may be made of glass, stainless steel or any other suitable material. The table, of course, is rotated periodically by the shaft.

Mounted on support 2 beside the table is a bearing member 10, in which an overhanging horizontal shaft 11 is journaled. This shaft extends inwardly above the table to a point close to its center. The horizontal shaft supports one or more, preferably several wipers 12. These wipers are straight blade-like elements that are parallel to the shaft and are spaced from one another circumferentially around the shaft. The simplest way to support the wipers is to mount them on the periphery of a cylindrical member, such as a slotted drum 13, that is rigidly mounted on the shaft. This drum is directly above the table and is positioned so that the lowermost wiper will frictionally engage the top of the table. The wipers are made of any material suitable for picking up dust from the underlying surface and retaining it until it is removed by positive action later. For example, the wipers may be made of leather, cloth or felt.

This apparatus can be so designed that at the end of each revolution of the table, the drum will turn just far enough to remove from the table the particular wiper that was engaging it at the time and bring the next wiper down into engagement with the table. This turning of the drum can be accomplished in various ways, but a simple way of doing it is to mount a miter gear 15 on the inner end of the drum shaft near a vertical post 16 extending upwardly from the center of the table, to which it is rigidly connected. The post can be an extension of vertical shaft 1. A small segment 17 of a horizontal miter gear is rigidly mounted on the post in a position to engage the drum gear during part of a revolution of the post, whereby the gear will be turned the necessary few degrees to bring a new wiper down into contact with the top of the table.

This apparatus is exposed to the atmosphere in the area wherein it is desired to sample dustfall so that dust in the air can settle onto the upper surface of the stationary table. At the end of a predetermined sampling period, for example, an hour, the timer 6 closes the electric circuit to the motor so that the table will be rotated a full revolution. As the table rotates, the dust that has accumulated on it is brought into engagement with the lowermost wiper and adheres to it, whereby the table is wiped clean of dust. As the table is completing its revolution, the gear segment 17 is moved into engagement with the drum gear and thereby turns the drum just far enough to remove the dust laden wiper out of contact with the table and to move the following wiper into engagement with the table. The motor then stops and everything comes to rest again and remains that way during the next sampling period. Consequently, the apparatus consumes but little energy, so a battery is satisfactory for operating it.

The wiper that was removed from the collecting surface of the table when the drum was turned is now considered to be in a storage position. The drum can be protected by a removable cover (not shown) so that the stored dust will be protected from wind and rain. When the dust laden wiper just mentioned has been carried to a suitable storage position, usually at the top of the drum, the dust that it swept from the table is removed from the wiper and measured. The removal of the dust from the wiper is best accomplished by a vacuum system that includes a vacuum pump 20 connected by a hose 21 to a nozzle 22 that can be moved lengthwise of the wiper to draw off the dust that it carries. For collecting this dust, a filter holder 23 may be mounted in the air line of the vacuum system. This holder surrounds the air line, which is split apart inside the holder. The holder is slotted beside the split to accommodate a filter paper in the form of a tape 24 or a rotatable disc that extends across the air line. Air drawn into the nozzle carries with it the dust from the wiper and flows through the filter paper, on which it leaves the entrained dust. As each wiper is cleaned of dust in this way, a new area of the filter paper is exposed to the air stream to receive the dust sample. The area of the filter paper on which each collection of dust is deposited is extremely small in comparison with the area of the horizontal collecting surface of the table, so the dust is concentrated in a small spot 25 as shown in FIG. 3.

The samples of dust on the filter paper are far too small to be weighed. Nevertheless, when properly concentrated in suitably small circular areas they are visible as dark stains and can easily be measured by optical means. They can be measured by a light reflecting system or by a light transmission system. Apparatus for the latter is shown in FIG. 4, where it will be seen that the filter paper 24 has been placed over a small opening 26 in the top of a box 27 containing an electric lamp 28. The opening is no larger than the dust sample 25 on the paper. The light rays passing up through this opening and the dust spot activate a photoelectric cell 29 mounted above the filter paper in a small housing 30, and this cell in turn operates a micro-ammeter 31 which shows the amount of light transmitted. The lower the light intensity, the greater the dust concentration.

Although the wipers have been described herein as being stationary while the collecting table is rotating beneath them, it will be understood that it would be a simple reversal of action to hold the table stationary and slide the wipers around it during the wiping cycle.

I claim:

1. Dustfall sampling apparatus, comprising a table having a smooth horizontal upper surface for collecting falling dust, a rotatable cylindrical member above the table having its axis extending substantially radially of the table, a series of parallel wipers extending lengthwise of said member and carried thereby for wiping dust from said collecting surface and retaining it on them, the wipers being spaced circumferentially around said member, means for rotating said cylindrical member intermittently to move each successive wiper into contact with said collecting surface for a predetermined period of time and then toward a storage position, means for effecting relative wiping movement between said collecting surface and the wiper engaging it to transfer dust from said surface to the wiper, means for removing dust from each successive wiper in storage position, and means for collecting the dust so removed for subsequent measurement.

2. Dustfall sampling apparatus according to claim 1, in which said means for effecting wiping movement rotate the table.

3. Dustfall sampling apparatus according to claim 2, in which said member-rotating means include means rotatable by the table and operatively connected with said cylindrical member.

4. Dustfall sampling apparatus according to claim 2, including a timer controlling said table rotating means for periodically holding the table stationary for a predetermined period to collect falling dust.

5. Dustfall sampling apparatus according to claim 2, in which said member-rotating means include a centrally located vertical post on said table, a laterally projecting element on the post, and means carried by said cylindrical member for engagement by said element during part of each revolution of the post at the end of said rotation of said table to turn the cylindrical member a predetermined number of degrees.

6. Dustfall sampling apparatus according to claim 1, in which said dust removing and collecting means include an air filter and suction means for withdrawing dust from the wiper that is in said storage position and concentrating it in an area of the filter that is much smaller than the dust collecting area of the wiper.

7. Dustfall sampling apparatus, comprising a smooth horizontal surface for collecting falling dust, a series of wipers above said surface for removing dust therefrom and retaining it on them, each wiper having a dust collection area that is much smaller than said collecting surface, means for moving the dust collection area of each successive wiper into contact with said collecting surface for a predetermined period and then to a storage position, means for effecting relative wiping movement between said surface and the wiper engaging it to transfer the dust from the collecting surface to the wiper, an air filter, and suction means for withdrawing dust from the wiper that is in storage position and concentrating it in an area of the filter that is much smaller than the dust collection area of the wiper.

8. Dustfall sampling apparatus according to claim 7, in which said suction means include an air conduit between the wiper in storage position and the filter for conveying dust-laden air from the wiper to the filter, the outlet of said conduit at the filter being substantially the same size as said small filter area.

References Cited

UNITED STATES PATENTS

| | | | |
|---|---|---|---|
| 2,492,158 | 12/1949 | Compte et al. | 73—425 |
| 3,074,276 | 1/1963 | Moos | 73—425 |
| 3,091,967 | 6/1963 | Hurdlow et al. | 73—421UX |
| 3,430,496 | 3/1969 | Swanberg et al. | 73—425 |

OTHER REFERENCES

Publication: "Vacuum Probe Sampler Removes Micron-Sized Particles From Surfaces," AEC–NASA Tech Brief, July 1968. Brief No. 68–10231.

S. CLEMENT SWISHER, Primary Examiner

D. M. YASICH, Assistant Examiner